(12) United States Patent
Harkless et al.

(10) Patent No.: US 7,620,219 B2
(45) Date of Patent: Nov. 17, 2009

(54) PATTERN-BASED INTERCHANGE FORMAT

(75) Inventors: Curt Harkless, Los Angeles, CA (US); Eric M. Shrader, Los Angeles, CA (US)

(73) Assignee: Bioscrypt Inc. (CA)

( * ) Notice: Subject to any disclaimer, the term of this patent is extended or adjusted under 35 U.S.C. 154(b) by 521 days.

(21) Appl. No.: 10/524,339

(22) PCT Filed: Aug. 12, 2003

(86) PCT No.: PCT/CA03/01218

§ 371 (c)(1), (2), (4) Date: Jul. 18, 2005

(87) PCT Pub. No.: WO2004/015615

PCT Pub. Date: Feb. 19, 2004

(65) Prior Publication Data

US 2005/0254693 A1   Nov. 17, 2005

(30) Foreign Application Priority Data

Aug. 12, 2002 (CA) ................................. 2397576

(51) Int. Cl.
*G06K 9/00* (2006.01)
(52) U.S. Cl. ..................... 382/124; 382/173
(58) Field of Classification Search .................. 382/124
See application file for complete search history.

(56) References Cited

U.S. PATENT DOCUMENTS

| | | | | |
|---|---|---|---|---|
| 5,509,083 A | * | 4/1996 | Abtahi et al. | 382/124 |
| 5,659,626 A | * | 8/1997 | Ort et al. | 382/125 |
| 5,799,098 A | * | 8/1998 | Ort et al. | 382/125 |
| 5,909,501 A | * | 6/1999 | Thebaud | 382/124 |
| 5,915,034 A | * | 6/1999 | Nakajima et al. | 382/124 |
| 5,926,555 A | * | 7/1999 | Ort et al. | 382/124 |
| 6,002,784 A | * | 12/1999 | Sato | 382/124 |
| 6,049,621 A | * | 4/2000 | Jain et al. | 382/125 |
| 6,111,978 A | * | 8/2000 | Bolle et al. | 382/125 |
| 6,185,318 B1 | * | 2/2001 | Jain et al. | 382/125 |

(Continued)

OTHER PUBLICATIONS

Grassell, Antonio: "On the Automatic Classification of Fingerprints—Some Considerations on the Linguistic Interpretation of Pictures", Methodologies of Pattern Recognition, 1969, pp. 253-273, XP008010506, University Di Pisa, Pisa, Italy.

*Primary Examiner*—Matthew C. Bella
*Assistant Examiner*—Sath V. Perungavoor
(74) *Attorney, Agent, or Firm*—Michael Best & Friedrich LLP

(57) ABSTRACT

An approach for the compression of images such as fingerprints may involve a resolution reduction of an image before forming a cellular representation of the resulting resolution-reduced image. A given fingerprint image is divided into a number of finger pattern cells. Each finger pattern cell is then compared to each finger pattern cell in a set of predetermined finger pattern cells to find a close match. The set of closely matching predetermined finger pattern cells forms the cellular representation. The cellular representation may then be used as a basis for a finger pattern interchange data format for use with pattern-based fingerprint matching algorithms. The finger pattern interchange data comprises an identification of the predetermined finger pattern cells that most closely approximate the finger pattern cells that make up the fingerprint image.

16 Claims, 6 Drawing Sheets

U.S. PATENT DOCUMENTS

| | | | |
|---|---|---|---|
| 6,263,091 B1 * | 7/2001 | Jain et al. | 382/125 |
| 6,266,433 B1 * | 7/2001 | Bolle et al. | 382/125 |
| 6,289,117 B1 * | 9/2001 | Li | 382/150 |
| 6,466,686 B2 * | 10/2002 | Senior | 382/124 |
| 2005/0254693 A1 * | 11/2005 | Harkless et al. | 382/124 |
| 2007/0217708 A1 * | 9/2007 | Bolle et al. | 382/276 |
| 2008/0285815 A1 * | 11/2008 | Bolle et al. | 382/115 |
| 2008/0298646 A1 * | 12/2008 | Wennergren | 382/124 |

\* cited by examiner

PATTERN-BASED INTERCHANGE FORMAT

FIELD

The present invention relates to exchanging biometric information and, in particular, to a pattern based interchange format that reduces resources required to store a representation of biometric information.

BACKGROUND

In an era of increasing security concerns, biometric-related innovations are becoming increasingly valuable tools for authenticating the identity of individuals. One biometric in particular, the fingerprint, has long been known to be unique to each individual, however others, such as the retinal scan, are gaining increasing use. Traditionally, a "hard copy" of an individual fingerprint was obtained and stored as ink on paper. Many modern methods now exist, however, for obtaining, storing and transmitting fingerprint images electronically.

The obtaining, storing and transmitting of fingerprint images is typically performed as part of an effort to match a sample fingerprint to a master fingerprint. There are currently two generic forms of algorithms for fingerprint matching. The first form of algorithm uses minutiae-based analysis while the second form of algorithm uses pattern-based analysis.

Several patents (such as U.S. Pat. No. 5,239,590 to Yamamoto, U.S. Pat. No. 6,301,376 to Draganoff and U.S. Pat. Nos. 5,363,453 and 6,212,290 to Gagne et al.) disclose pattern-based fingerprint matching algorithms.

Yamamoto describes a fingerprint verification method wherein a sample fingerprint image is separated into a plurality of blocks. Each block is then subdivided into a plurality of areas. For each area, a direction code is determined. The direction codes of areas in a master fingerprint are compared to direction codes of corresponding areas in a sample fingerprint to determine a "dispersion" for each area. Yamamoto describes a data record format in conjunction with the fingerprint verification method. The data record includes an index for each of the blocks, where the index is calculated based on a minimum dispersion area in each block.

Draganoff describes a fingerprint verification method wherein a statistical similarity between an enrolled (master) fingerprint and the (sample) fingerprint to be verified is sought. Initially, a match is sought for a first yardstick in an amount of data representing the fingerprint image to be verified. Yardstick data is moved throughout the image, preferably in a predetermined order, and comparisons are made to find a sufficient match. Once the first yardstick has been matched, the location of the match is known and, because the location of the other yardsticks to be tested is known relative to the position of the first yardstick, the method and apparatus checks other yardsticks in only a limited number of locations.

Gagne et al. describes a non-minutiae-based fingerprint verification method and system wherein a digitised numerical identifier is used to uniquely represent a fingerprint. The digitised numerical identifier is derived from a ridge count taken at various parts of the fingerprint. The digitised numerical identifier described by Gagne et al. may be reduced to 24 bytes to fit among the information contained on a magnetic stripe of a card such as a credit card.

U.S. Pat. Nos. 5,841,888, 5,845,005 and 6,021,211 to Setlak et al. provide a method (and related apparatus) for indexing fingerprints to improve the performance of fingerprint cold-search operations. In particular, ridge flow direction vectors are used to determine a curliness index of a sample fingerprint. The curliness index of the sample fingerprint may then be used to reduce the field of a search for a matching fingerprint.

There remains a need for an efficient data format for storing and transmitting images such as fingerprints.

SUMMARY OF INVENTION

An approach for the compression of images such as fingerprints involves forming a cellular representation of the image to be compressed. An image, such as a given fingerprint image, is divided into a number of finger pattern cells. Each finger pattern cell is then compared to each finger pattern cell in a set of predetermined finger pattern cells to find a close match. The set of closely matching predetermined finger pattern cells forms the cellular representation. The cellular representation may then be used as a basis for a finger pattern interchange data format for use with pattern-based fingerprint matching algorithms. The finger pattern interchange data comprises an identification of the predetermined finger pattern cells that most closely approximate the finger pattern cells that make up the fingerprint image.

In accordance with an aspect of the present invention there is provided a method of obtaining a representation of an image. The method includes providing a stored set of cellular region representations and sub-dividing the image into a plurality of cellular regions. For each cellular region, the method further includes comparing image information of each cellular region to each cellular region representation of a plurality of the cellular region representations and, based on the comparison, selecting one cellular region representation of the set of cellular region representations to represent each cellular region. Additionally, other aspects of the present invention provided an apparatus for carrying out this method and a computer readable medium for adapting a general purpose computer to carry out this method.

In accordance with another aspect of the present invention there is provided method of obtaining a representation of an image. The method includes providing a stored set of cellular region representations, each cellular region representation comprising a set of values for a parameter set, and sub-dividing the image into a plurality of cellular regions. For each cellular region, the method further includes obtaining a cellular region set of values for the parameter set for each cellular region and comparing the cellular region set of values to each cellular region representation of a plurality of the cellular region representations and, based on the comparison, selecting one cellular region representation of the set of cellular region representations to represent each cellular region.

Other aspects and features of the present invention will become apparent to those of ordinary skill in the art upon review of the following description of specific embodiments of the invention in conjunction with the accompanying figures.

BRIEF DESCRIPTION OF DRAWINGS

In the figures which illustrate an example embodiment of this invention.

DETAILED DESCRIPTION

Obtaining a fingerprint image often begins with the capture (by sampling) of a raw fingerprint image by a fingerprint sensor. The raw fingerprint image typically retains the full resolution and spatial extent permitted by the sensor. Note that resolution is the number of picture elements (pixels) per inch, often expressed in dots per inch (dpi), in a sampled fingerprint image. A single dpi is roughly equivalent to 0.039 pixels per mm. Another term used when describing a fingerprint image is "dimension", which is the number of pixels in either the x-direction or the y-direction.

Figure 1:
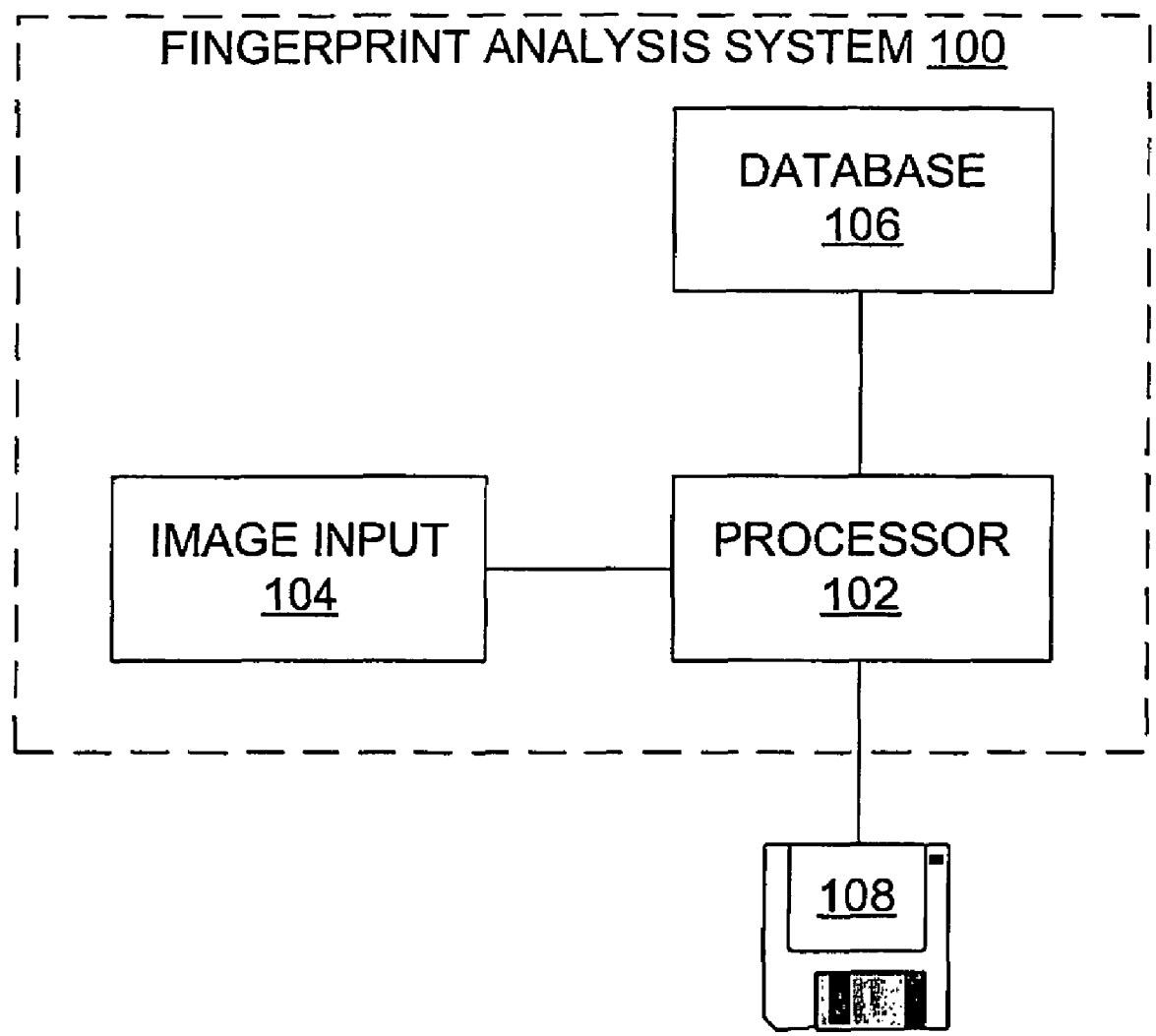
FIG. 1 illustrates block diagram of a fingerprint analysis system according to an embodiment of the present invention.

FIG. 1 illustrates block diagram of a fingerprint analysis system 100. In particular, the fingerprint analysis system 100 includes a processor 102 adapted to carry out methods exemplary of the present invention. The processor 102 is coupled to an image input 104 from which may be received a raw fingerprint image. The image input 104 may be, for example, a fingerprint sensor such as the AF-S2 fingerprint sensor, from Authentec of Melbourne, Fla. The processor 102 is also coupled to a database 106 in which is stored a set of cellular region representations, whose use will become clear hereinafter. The fingerprint analysis system 100 may be loaded with instructions for carrying out methods exemplary of this invention from a software medium 108 which could be a disk, a tape, a chip or a random access memory containing a file downloaded from a remote source.

Figure 2:
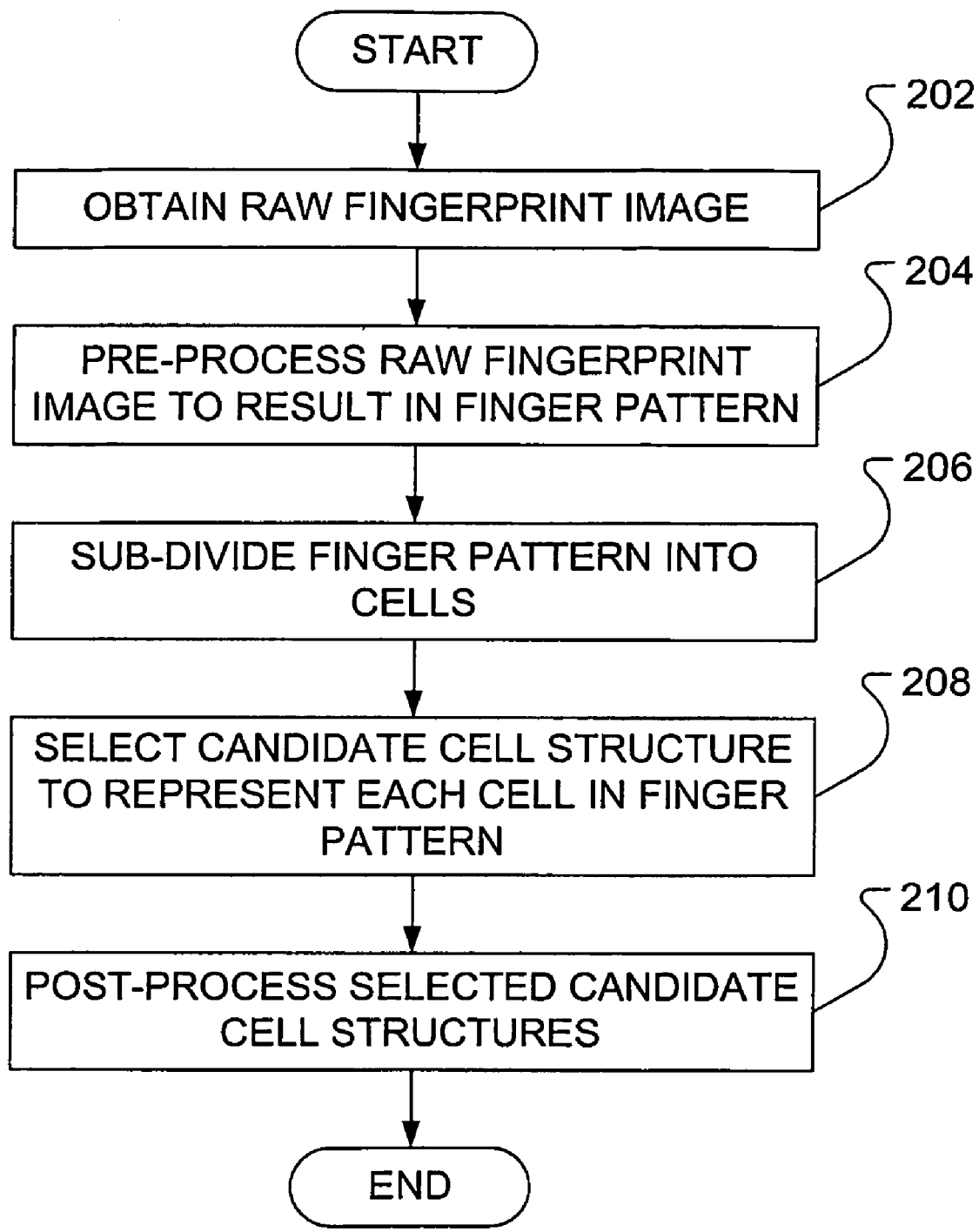
FIG. 2 illustrates steps in a data reduction method according to an embodiment of the present invention.

In overview, aspects of the present invention relate to the processing of the raw fingerprint image to result in a new version of the raw fingerprint image, where the new version requires less memory than the raw fingerprint image. In view of FIG. 2, the raw fingerprint image is initially obtained (step 202). The raw fingerprint image may then be pre-processed (step 204) to yield a finger pattern, which is an image more suited to the subsequent processing step. The processing, which may be called data reduction, requires access to the stored set of cellular region representations in the database 106 (FIG. 1) and involves sub-dividing (step 206) the finger pattern into a plurality of cellular regions. Subsequently, for each cellular region of the image to be processed, image information from the cellular region may be compared to the cellular region representations of the set. Then, based on the comparison, one cellular region representation from the set may be selected (step 208) to represent each cellular region of the image to be processed. Optionally, the cellular region representations selected to represent the entire finger pattern may be post-processed (step 210) to provide further information.

The pre-processing of step 204 may, for instance, include cropping or padding the raw fingerprint image. Cropping relates to the removal of the outer regions of the raw fingerprint image. Padding relates to the embedding of the raw fingerprint image in a larger array (usually filled with zeroes) to produce a resulting image of greater dimension. Additionally, the raw fingerprint image may be down-sampled, which reduces the resolution of the image (reduces the number of pixels) by down-sampling the image.

Pattern based fingerprint algorithms generally require less resolution than is output by sensors. Accordingly, the first step in data reduction may involve down-sampling the raw fingerprint image to obtain a lower resolution image. For example, the AF-S2 fingerprint sensor provides an output measuring 128 samples×128 samples from an area measuring 13 mm×13 mm, which is equivalent to 250 dpi. For pattern-based fingerprint matching algorithms, sampling at 200 dpi is generally sufficient.

The raw fingerprint image obtained from the AF-S2 fingerprint sensor may be down-sampled to produce a lower resolution (e.g., 200 dpi) image. Note that, prior to down-sampling, the raw fingerprint image may be padded or cropped such that the resulting lower resolution image is of dimensions that facilitate further processing.

Figure 3A:
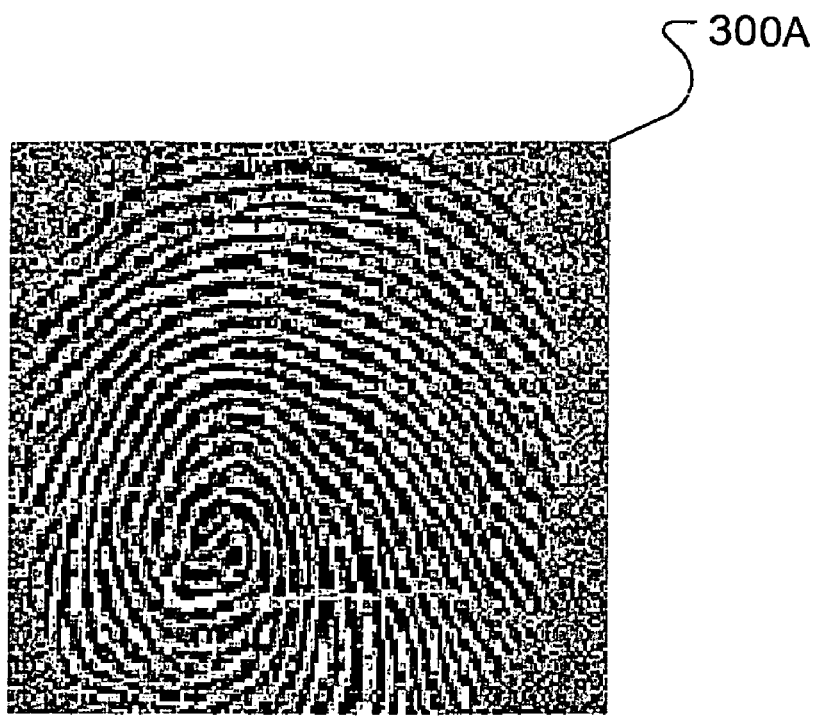
FIG. 3A illustrates an exemplary raw fingerprint image.
Figure 3B:
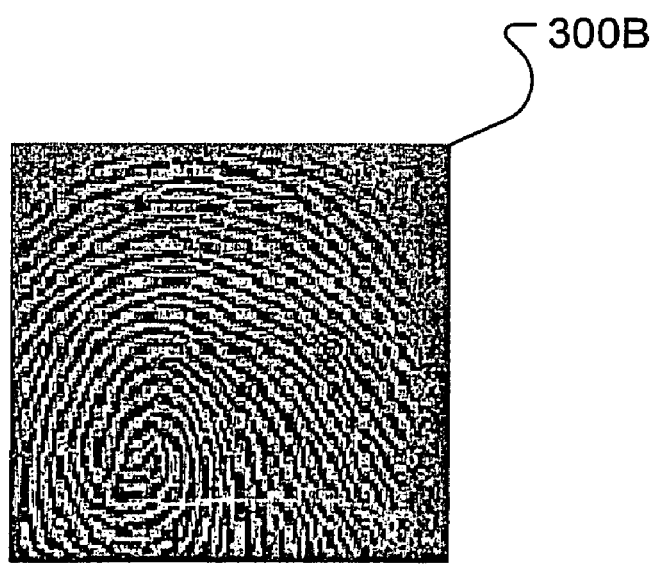
FIG. 3B illustrates an exemplary finger pattern derived from the raw fingerprint image of FIG. 3A.

An exemplary raw fingerprint image 300A is illustrated in FIG. 3A. The exemplary raw fingerprint image 300A is 128 pixels×128 pixels, sampled at 250 dpi. A lower resolution image 300B, resulting from pre-processing the exemplary raw fingerprint image 300A, is illustrated in FIG. 3B. The pre-processing in this exemplary case involved first cropping the exemplary raw fingerprint image 300A to 120 pixels×120 pixels and then down-sampling to 200 dpi. The lower resolution image 300B produced, which may be called a "finger pattern", is 96 pixels×96 pixels.

Figure 4:
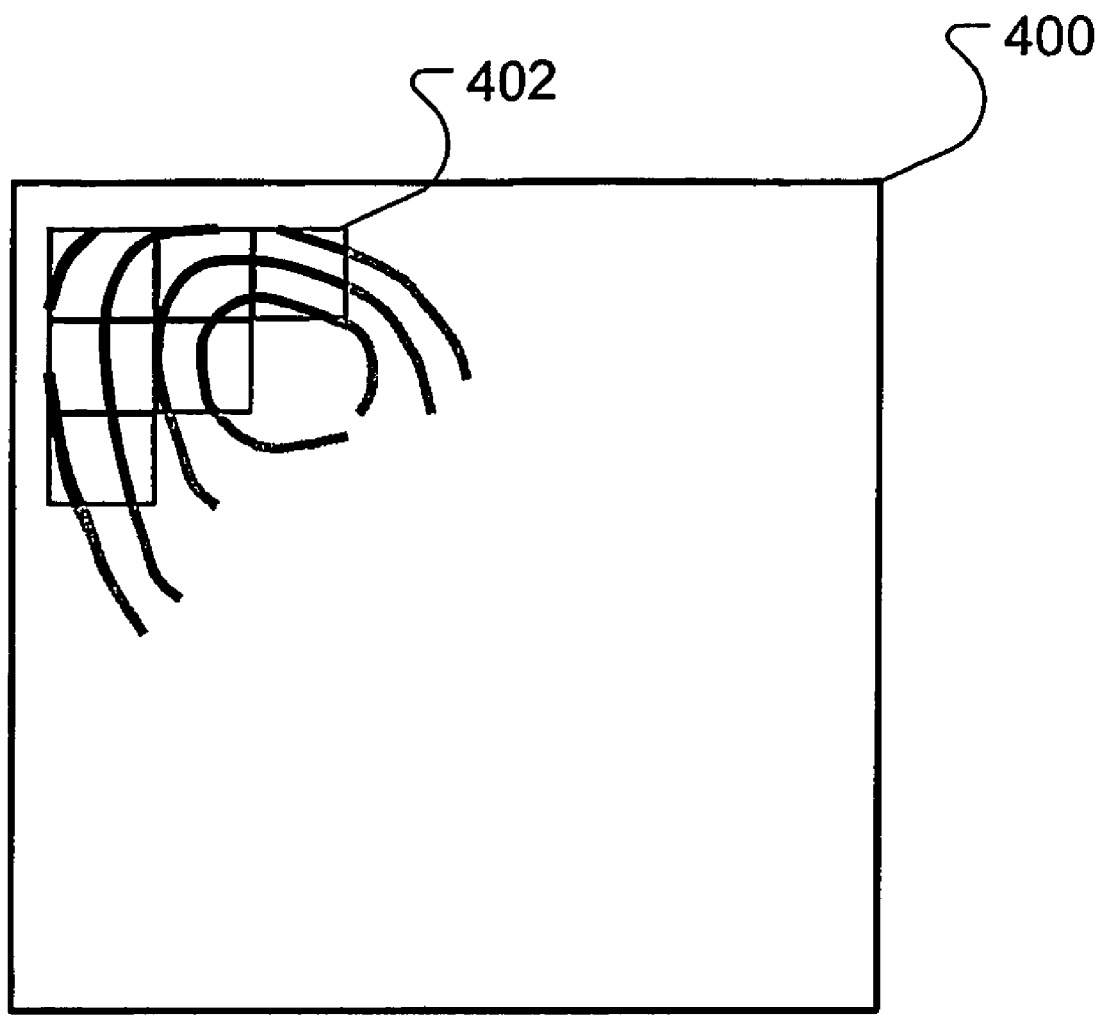
FIG. 4 illustrates a partially shown finger pattern and cells into which the finger pattern is to be subdivided.

Determining a cellular representation of the finger pattern involves dividing the finger pattern into a grid of cells. A cell 402 is indicated on a partially shown finger pattern 400 in FIG. 4.

Figure 5:
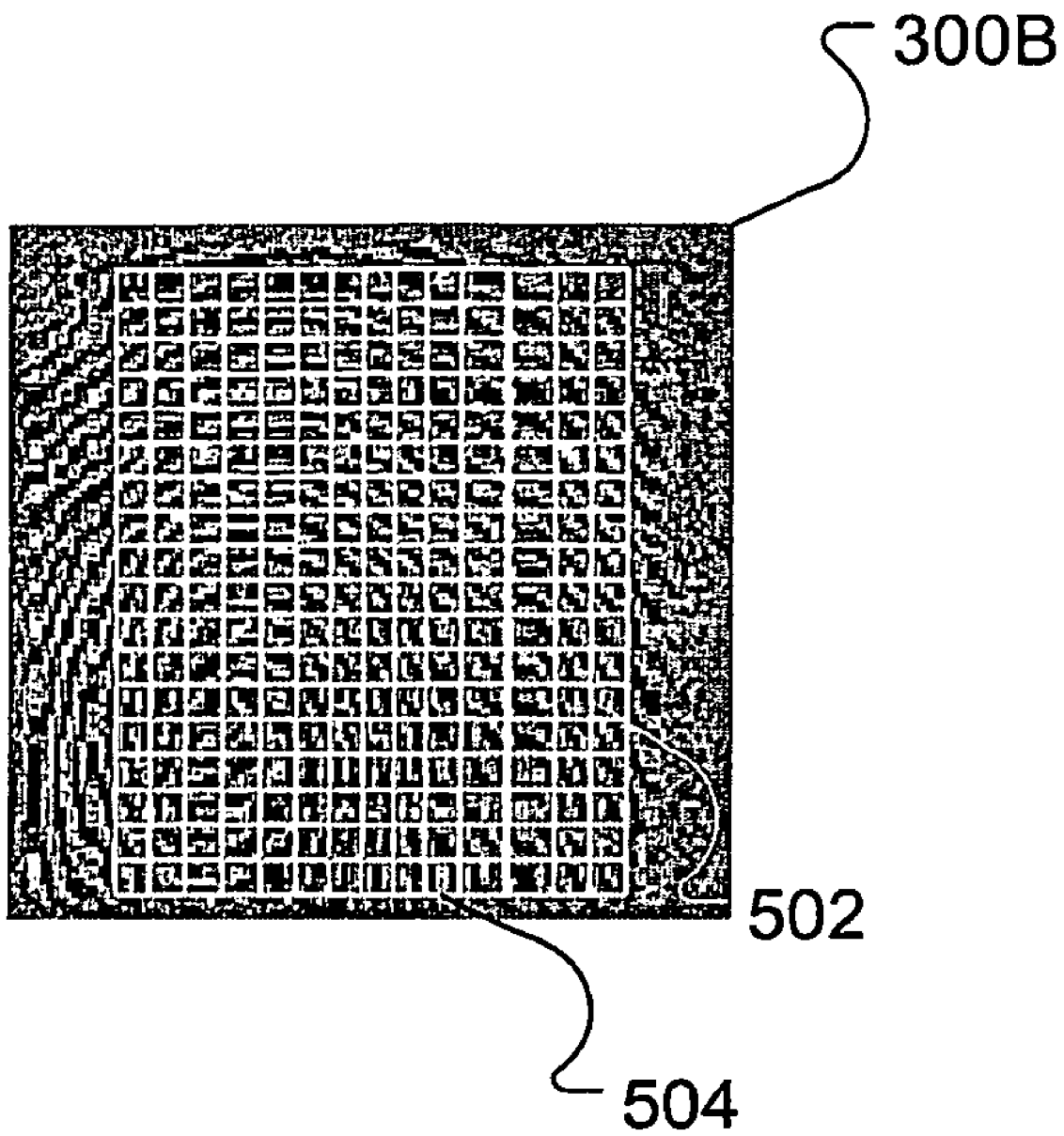
FIG. 5 illustrates a grid of cells overlaying the finger pattern of FIG. 3B.

As illustrated in FIG. 5, a grid 504 is made up of cells 502, each having a dimension of 5 pixels×5 pixels. The grid 504, which is superimposed over the exemplary finger pattern 300B of FIG. 3B, is 14 cells×18 cells, representing an image area that is 70 pixels×90 pixels, or 8.9 mm×11.4 mm. Each pixel in the exemplary finger pattern 300B can take on one of 256 shades of grey represented by eight bits. As such, before data reduction, each cell 502 requires 200 bits of storage (5 pixels×5 pixels×8 bits).

At each cell 502, the finger pattern 300B may be represented by one of 512 candidate cell structures, as described hereinafter.

As discussed briefly hereinbefore, a cellular region representation (a candidate cell structure) from a stored set of cellular region representations may be selected to represent each cellular region (cell 502) of an image to be processed. Each of the candidate cell structures of the stored set is defined as a two-dimensional cosinusoidal pattern.

Figure 6A:
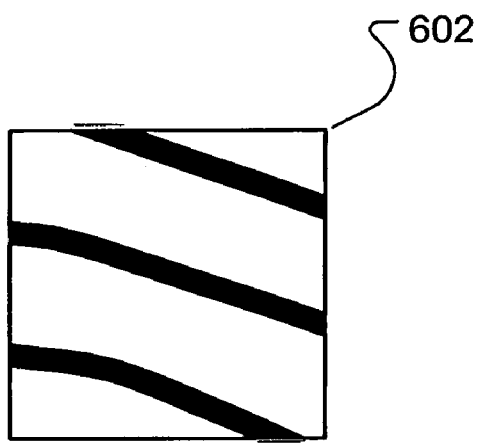
FIG. 6A illustrates a cell of a finger pattern.
Figure 6B:
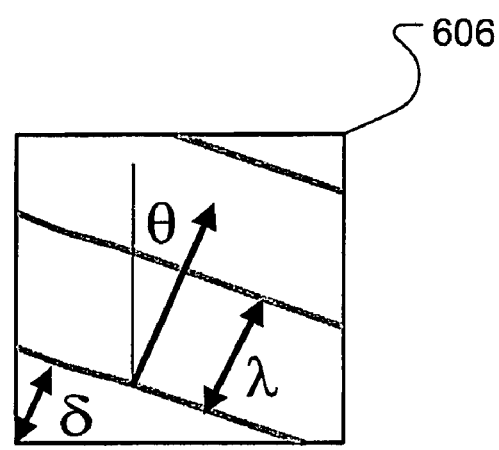
FIG. 6B illustrates a candidate cell structure corresponding to the cell of FIG. 6A.

A cell 602 from a finger pattern is illustrated in FIG. 6A. An exemplary candidate cell structure 606, illustrated in FIG. 6B, is selected to represent the cell 602 of FIG. 6A. The exemplary candidate cell structure 606, and, indeed, all the candidate cell structures of the set, may be defined by three parameters: the ridge angle, $\theta$; the ridge spacing, $\lambda$; and the phase offset, $\delta$.

The set of candidate cell structures may include candidate cell structures with ridge angle, $\theta$, varying from 0 to 157.5 degrees in eight equal increments of 22.5 degrees so that the ridge angle may be represented by three bits. The set of candidate cell structures may include candidate cell structures with ridge spacing, $\lambda$, which correspond to 0 to ⅞ of Nyquist frequency, in eight equal (⅛) increments so that the ridge spacing may be represented by three bits. The Nyquist frequency is the (spatial) frequency at which exactly two samples of an image span a complete period of a (co)sinusoidal pattern. For the 200 dpi exemplary finger pattern, the candidate cell structures may have ridge spacing corresponding to 0 to 3.4 line pairs per millimetre (lp/mm). The set of candidate cell structures may include candidate cell structures with phase offset, $\delta$, ranging from 0 to 315 degrees in eight equal increments of 45 degrees so that the phase offset may be represented by three bits.

In this way, each of the cells 502 in the finger pattern 300B may be represented by the most similar candidate cell structure among the 512 (8×8×8) permutations of cell structure. Each candidate cell structure requires nine bits of data storage, three bits for each of the three parameters, which is significantly reduced from the 200 bits required per cell 502 before data reduction.

In this manner, each cell 502 of the exemplary finger pattern 300B may be represented by a candidate cell structure among the 512 permutations of cell structure. A Finger Pattern Data Record may be defined in a pattern-based interchange format that includes an indication of a candidate cell structure corresponding to each cell 502 of the exemplary finger pattern 300B. For the example under consideration, such a Finger Pattern Data Record includes information for the grid 504 of 14 cells by 18 cells with 9 bits for each cell, which requires 284 bytes of storage. Notably, data in the Finger Pattern Data Record may be stored in a compacted bit form with no record separators or field tags, i.e., fields are separable by bit count only.

Post-processing of the selected candidate cell structures (step 210, FIG. 2) may include a determination of a quality parameter associated with individual cells or groups of cells. For example, a block may be defined measuring 2 cells×2 cells and may be associated with a quality parameter. Such a quality parameter may be represented by four bits, thereby permitting a range of 0 to 15, with higher numbers indicating better quality. Quality may, for instance, be defined as a measure of the contrast or fidelity of the finger pattern information in the block of cells. In the present example, with 14×18=252 cells, 7×9=63 quality parameter values are required, adding just under 32 bytes to the size of the Finger Pattern Data Record. The quality parameter allows a weighting of the importance of various areas of the image.

Obviously, different sets of candidate cell structures could be contemplated with difference gradations for each parameter, thereby requiring a greater or lesser number of bits per candidate cellular representation. Also the selected size of each cell in the fingerprint image could be different. Furthermore, candidate cellular structures other than the sinusoidal-based structures contemplated here may be used.

While the example embodiment has been described with respect to fingerprints, it will be obvious to those skilled in the art that this data reduction process could be applied to other forms of images, such as retinal scans and iris images, using the appropriate cell structure.

Other aspects will be obvious to those skilled in the art; therefore the invention is defined in the claims.

We claim:

1. A method of obtaining a compact representation of a fingerprint image, comprising:
    providing a stored set of cellular region representations;
    sub-dividing said image into a plurality of cellular regions;
    for each cellular region:
        comparing image information of said each cellular region to each cellular region representation of a plurality of said cellular region representations, where each cellular region representation of said set of cellular region representations is defined by a set of values for a parameter set, said parameter set comprising parameters of ridge angle and phase offset; and,
        based on said comparison, selecting one cellular region representation of said set of cellular region representations to represent said each cellular region in order to form said compact representation of said fingerprint image.

2. The method of claim 1 wherein said each cellular region representation is defined as a cosinusoidal pattern.

3. The method of claim 1 wherein said each cellular region representation has a set of values for said parameter set different from that of all other cellular region representations of said set of cellular region representations.

4. The method of claim 1 further comprising down-sampling said image to produce a down-sampled image prior to said sub-dividing.

5. The method of claim 1 further comprising storing each selected one of said set of cellular region representations in order to store a representation of said image.

6. The method of claim 1 wherein each of said cellular regions has identical spatial dimensions.

7. The method of claim 1 further comprising associating a quality parameter with one or more of said cellular regions.

8. The method of claim 1 wherein said phase offset for said each cellular region is a measure of a distance between an origin of said each cellular region and a ridge line in said each cellular region closest to said origin.

9. The method of claim 8 wherein said parameter set further comprises a parameter of ridge spacing.

10. A method of obtaining a representation of a fingerprint image, comprising:
    providing a stored set of cellular region representations;
    sub-dividing said image into a plurality of cellular regions;
    for each cellular region: comparing fingerprint image information of said each cellular region to each cellular region representation of a plurality of said cellular region representations; and,
    based on said comparison, selecting one cellular region representation of said set of cellular region representations to represent said each cellular region;
    wherein each cellular region representation of said set of cellular region representations comprises a set of values for a parameter set and wherein said fingerprint image information of said each cellular region comprises a set of values for said parameter set and wherein said parameter set comprises parameters of ridge angle, ridge spacing and phase offset.

11. A computer readable medium containing computer executable instructions which, when loaded into a processor, cause said processor to create a compact representation of a fingerprint image:
    provide a stored set of cellular region representations, where each cellular region representation of said set of cellular region representations is defined by a set of values for a parameter set, said parameter set comprising parameters of ridge angle and phase offset;
    sub-divide a fingerprint image into a plurality of cellular regions; and, for each cellular region, compare image information of said each cellular region to each cellular region representation of a plurality of said cellular region representations; and,
    based on said comparison, select one cellular region representation from said set of cellular region representations to represent said each cellular region in order to form said compact representation of said fingerprint image.

12. The computer readable medium of claim 11 wherein said phase offset for said each cellular region is a measure of a distance between an origin of said each cellular region and a ridge line in said each cellular region closest to said origin.

13. The computer readable medium of claim 12 wherein said parameter set further comprises a parameter of ridge spacing.

14. Apparatus for obtaining a compact representation of a fingerprint image, comprising:
- a database storing a set of cellular region representations, where each cellular region representation of said set of cellular region representations is defined by a set of values for a parameter set, said parameter set comprising parameters of ridge angle and phase offset;
- an image input; and
- a processor operatively coupled to said image input and said database, said processor adapted to:
- sub-divide said fingerprint image into a plurality of cellular regions; and
- for each cellular region: compare image information of said each cellular region to each cellular region representation of a plurality of said cellular region representations; and, based on said comparison, select one cellular region representation from said set of cellular region representations to represent said each cellular region in order to form said compact representation of said fingerprint image.

15. The apparatus of claim 14 wherein said phase offset for said each cellular region is a measure of a distance between an origin of said each cellular region and a ridge line in said each cellular region closest to said origin.

16. The apparatus of claim 15 wherein said parameter set further comprises a parameter of ridge spacing.

* * * * *

UNITED STATES PATENT AND TRADEMARK OFFICE
CERTIFICATE OF CORRECTION

PATENT NO. : 7,620,219 B2 Page 1 of 1
APPLICATION NO. : 10/524339
DATED : November 17, 2009
INVENTOR(S) : Harkless et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1094 days.

Signed and Sealed this

Twenty-sixth Day of October, 2010

David J. Kappos
*Director of the United States Patent and Trademark Office*